United States Patent [19]

Misener et al.

[11] Patent Number: 4,729,755
[45] Date of Patent: Mar. 8, 1988

[54] ELEVATOR FOR DELICATE ARTICLES

[75] Inventors: Gerald C. Misener; Colin D. McLeod, both of Fredericton, Canada

[73] Assignee: Canadian Patents and Development Ltd., Ottawa, Canada

[21] Appl. No.: 942,268

[22] Filed: Dec. 26, 1986

[51] Int. Cl.⁴ ................... F16H 55/32; B65G 15/14
[52] U.S. Cl. .................................. 474/166; 474/190; 198/604; 198/620
[58] Field of Search .............. 474/152, 153, 166, 167, 474/171–173, 184, 161, 190; 198/604, 620, 624; 56/38, 9, 49, 181, 345

[56] References Cited

U.S. PATENT DOCUMENTS

| | | | |
|---|---|---|---|
| 2,016,268 | 10/1935 | Griffith | 198/604 X |
| 2,297,573 | 9/1942 | McDonald et al. | 198/620 X |
| 2,760,378 | 8/1956 | Deventer, III | 474/190 X |
| 3,285,392 | 11/1966 | Wood | 198/620 X |
| 3,880,274 | 4/1975 | Bechtloff et al. | 198/604 X |
| 4,457,422 | 7/1984 | Hurd | 198/620 X |

*Primary Examiner*—Stephen J. Novosad
*Assistant Examiner*—Thuy M. Bui
*Attorney, Agent, or Firm*—Ronald G. Bitner

[57] ABSTRACT

An elevator comprising a rotating cylinder having a resilient surface, and an endless belt that engages a circumferential segment of the cylinder. Articles are captured between the resilient surface and the belt as they come into contact and are released when they separate at an elevated position.

One use envisaged for the invention is an elevator for a potato harvester for elevating potatoes from the digging bed to a height suitable for loading onto a vehicle.

8 Claims, 4 Drawing Figures

U.S. Patent     Mar. 8, 1988     4,729,755
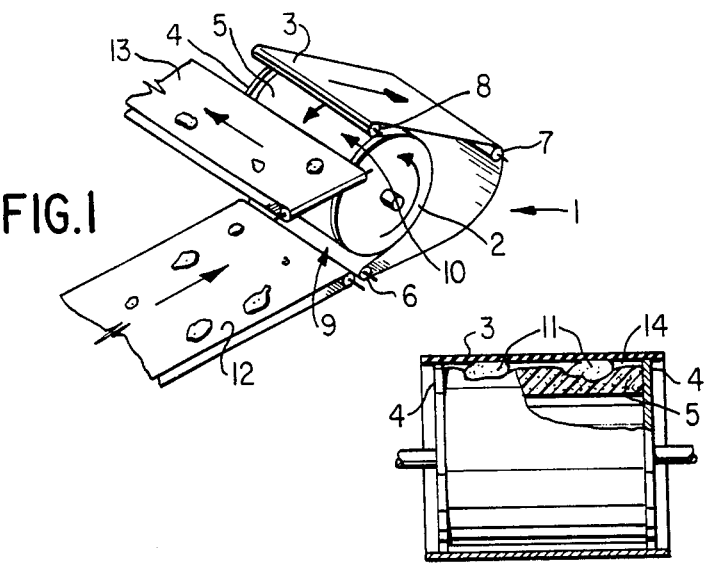
FIG.1
FIG.2
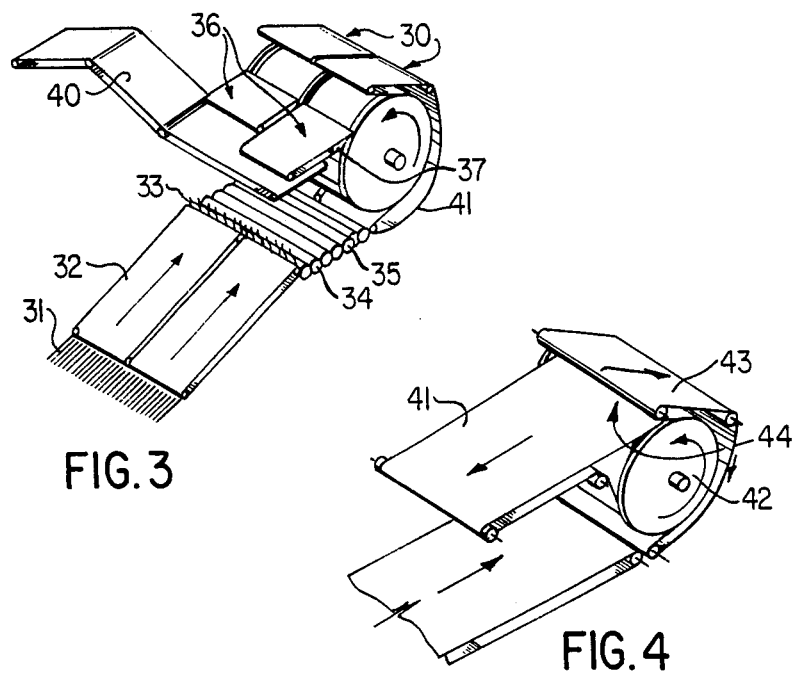
FIG.3
FIG.4

ELEVATOR FOR DELICATE ARTICLES

FIELD OF THE INVENTION

The invention relates to an elevator for delicate articles.

BACKGROUND OF THE INVENTION

In commonly used potato harvester, injury to the tubers results while being conveyed from the ground to a height suitable for subsequent unloading. Most harvester use open inclined elevators and injury results due to roll-back of the tubers down the inclined conveyor. Such roll-back can be reduced somewhat by the use of an endless belt known as an anti-roll belt above the conveyor. However this device is not entirely satisfactory as it does not prevent roll-back of the smaller tubers, since the belt is displaced from the conveyor surface by larger tubers.

SUMMARY OF THE INVENTION

An object of the present invention is to provide an elevator that minimizes injury to delicate articles, and particularly for articles having irregular size or shape.

The present invention provides an elevator for delicate articles comprising:
  a rotatably mounted cylinder having a plurality of spaced rims disposed concentrically about the cylinder, defining a riding surface for and endless belt;
  resilient articles engaging surface mateial disposed between the rims;
  an endless belt disposed adjacent to the cylinder; and
  a plurality of belt guiding members having longitudinal axis parallel with the rotating axis of the cylinder, a pair of said guiding members being spaced from one another and positioned about the cylinder for supporting and guiding the belt such that a portion of the belt engages a circumferential segment of the cylinder rims and follows along with the cylinder, when rotated, and wherein the region between one of the guiding members of said pair and the cylinder defines an entry region for receiving articles and the region between the other guiding member of said pair and the cylinder defines an egress region.

BRIEF DESCRIPTION OF THE DRAWINGS

FIG. 1 is a schematic perspective view of an elevator in accordance with the present invention.

FIG. 2 is a partly sectional view showing details of the cylinder and belt of FIG. 1, showing articles being carried.

FIG. 3 is a schematic perspective view of an embodiment elevator in accordance with the present invention incorporated in a potato harvesting machine.

FIG. 4 is a schematic perspective view showing embodiment of an elevator of the present invention combined with a conveyor.

DESCRIPTION OF PREFERRED EMBODIMENTS

With reference to FIG. 1, the elevator 1 comprises a rotatably mounted cylinder 2 and an endless belt 3.

The cylinder 2 comprises at least two spaced rims 4 disposed concentrically about the cylinder to define a riding surface for the endless belt 3. Surrounding the cylinder 2 between the spaced rims 4 is a resilient material 5 defining an article engaging surface.

The endless belt 3 is mounted on guiding members shown in the form of rollers 6, 7 and 8 positioned with longitudinal axis parallel to that of the belt 3. The belt 3 engages a circumferential segment of the cylinder rims 4. The belt 3 may be driven by suitable drive means for rotating rollers 6 or 8. The cylinder 2 is freely rotatable and travels along with the belt 3 due to the frictional contact.

For counter-clockwise rotation of cylinder 2, as shown in Figure 1, the region between roller 6 and cylinder defines the entry region 9 for articles, while the region between roller 8 and the cylinder defines the egress region 10. A third roller 7 is positioned to keep adjacent loop portions of the belt separate from one another and provide tensioning of the belt so that the belt maintains contact with the cylinder rim 4.

Articles to be elevated are supplied to the entry region 9 by suitable conveyor means 12, and are recovered from the egress region 10 by a suitable receiver shown as a conveyor 13 positioned near the top portion of the cylinder.

With reference to FIG. 2, the resilient surface 5 of cylinder 2 may be recessed relative to the rims 4 to define a space 14 between the belt 3 and the cylinder 2. Such a space may be utilized to exclude smaller objects or material.

In operation, with reference to FIG. 1, articles supplied to the entry region 9 by suitable conveyor means 12 are captured between the rotating cylinder 2 and segment 13 of the belt 3 which engages the cylinder 2.

The cylinder 2 and belt 3 may be driven by suitable drive means which rotates rollers 6 or 8 clockwise. The cylinder 2 is rotated counterclockwise by frictional engagement with belt 3.

With specific reference to FIG. 2, the articles are forced by the belt 3 against the resilient material 5. The resilient material yields to accommodate the articles 11, and the articles are fixed in position relative to the rotating cylinder until the belt separates from the cylinder 2.

With reference again to FIG. 1, as the cylinder rotates the captured articles are carried upwards to the egress region 10 where the belt 3 separates from the cylinder 2. After the belt separates from the cylinder, the elevated articles are shown received by the conveyor 13 at the elevated position.

As indicated above, one application envisioned for the elevator of the present invention is in a potato harvester wherein the elevator is used to elevate potatoes from the digging bed to a height suitable for loading onto a vehicle.

FIG. 3 shows portions of a potato harvester incorporating two elevators 30 side by side. The harvestor incorporates some of the conventional components such as vibrating shares 31, draper chains 32, devining fingers 33, brushes 34, and clod rollers 35 positioned in front of the elevator 30. The elevator as described above carries the potatoes upwards and releases them onto receiving conveyors 36.

The conveyors 36 are designed to allow positioning near to the cylinder to prevent potatoes from lodging between the conveyor and cylinder. As shown the end of the conveyor 36 near the cylinder is in the form of a fixed guiding member 37 having a small radius. A suitable receiving conveyor 36 was found to be in the form of a 1 mm thick polyester belt with guiding member having a 13 mm radius, and positioned about 15 degrees past the top vertical position of the cylinder 38. The receiving conveyors 36 convey the potatoes to a conventional loading conveyor 40.

The resilient material for the cylinder may take various forms. A material found to be suitable for the potato harvester was open cell latex airfoam covered with Lycra (TM) to protect the foam from moisture and abrasion. The resilient material was recessed relative to the rims to provide a 25 mm space between the belt and resilient material. This space prevents continuous contacting and resulting wear of the resilient material by the belt and also prevents soil and smaller material from being elevated.

The resilience of the material used will depend in part on the density and the pressure sensitivity of the articles to be elevated.

A suitable belt for engaging the cylinder was found to be rubberized digger chains, with roller positioned such that the belt remains in contact with the cylinder for about 165 degrees.

In the embodiment of FIG. 3, the tension of the belt against the cylinder is provided by the force of gravity on the outer unsupported loop portion 40 of the belt. An alternative, with reference to FIG. 1, is to provide a tensioning device in conjunction with the roller 7, or one of the other guiding rollers.

An alternative to the receiving conveyors 36 in FIG. 3, is shown in FIG. 4. A resilient endless belt 41 surrounds the resilient surface of the cylinder 42 under belt 43. The belt 41 travels with the cylinder 42 and provides continuous transfer of the articles from the egress region 44 of the elevator.

It will be understood that the conveyor of the present invention may be used in various ways for different applications. It can be seen that the elevator may be used to lower articles by reversing the direction of travel and reversing the positioning of the entry and egress regions.

We claim:
1. An elevator for delicate articles comprising:
   a rotatably mounted cylinder having a plurality of spaced rims disposed concentrically about the cylinder, defining a riding surface for an endless belt said cylinder having;
   a resilient article engaging surface material disposed between the rims;
   an endless belt disposed adjacent to the cylinder; and a plurality of belt guiding members having longitudinal axis parallel with a rotating axis of the cylinder, a pair of said guiding members being spaced from one another and positioned about the cylinder for supporting and guiding the belt such that a portion of the belt engages a circumferential segment of the cylinder rims and follows along with the cylinder when rotated, and wherein a region between one of the guiding members of said pair and the cylinder defines an entry region for receiving articles and a region between the other guiding member of said pair and the cylinder defines an egress region.

2. The apparatus of claim 1, wherein the resilient surface of the cylinder is recessed relative to the rims to define a space between the belt and resilient surface, and wherein the depth of the space is less than the size of the articles to be carried.

3. The apparatus of claim 1, further comprising a receiving conveyor positioned at the egress region in proximity to an upper portion of the cylinder.

4. The apparatus of claim 1, wherein one of the guiding members comprises a roller operative when driven to move the belt and rotate the cylinder.

5. The apparatus of claim 1 wherein said plurality of belt guiding members includes a guiding member for supporting a loop portion of the belt not in engagement with the cylinder.

6. The apparatus of claim 6 further comprising tension means associated with one of the guiding members to ensure engagement of the belt and cylinder.

7. The apparatus of claim 1 further comprising a second resilient endless belt surrounding the resilient article engaging surface, and a guiding member having a longitudinal axis parallel to the rotating axis of the cylinder whereby the said second belt rotates with the cylinder for conveying articles outwardly and generally horizontally from said egress region.

8. The apparatus of claim 1 defining a component of a potato harvester.

* * * * *